UNITED STATES PATENT OFFICE.

JOHN H. KRETNER, OF BROOKLYN, NEW YORK.

PROCESS OF PREPARING BREAD-DOUGH.

1,235,330.     Specification of Letters Patent.     Patented July 31, 1917.

No Drawing.     Application filed June 6, 1917.   Serial No. 173,096.

*To all whom it may concern:*

Be it known that I, JOHN H. KRETNER, a citizen of the United States of America, residing at Brooklyn, Kings county, State of New York, have invented certain new and useful Improvements in Processes of Preparing Bread-Dough, of which the following is a full, clear, and exact description.

This invention relates to a new process for preparing dough for the manufacture of bread, more particularly rye-bread, and has for its object to produce an easily workable dough which will result in a digestible and palatable bread, such bread retaining its freshness for a longer period than usual in most rye-breads on the market.

I carry out my process in the manner following, but it will be understood that the proportions which I will hereinafter set forth and claim are merely illustrative for a certain batch of dough, and that smaller or larger batches can be prepared according to my process by proportionately varying the quantities mentioned.

I first take, (for instance) about 4 pounds of water and heat the same till it reaches about 200 degrees Fahr. When the water reaches this point, I add thereto about 2 pounds of rye-flour, and thoroughly mix or knead the same. I then set the same for about 12 hours to allow fermentation.

In the meantime, and while the above dough is fermenting, I produce a separate mixture or "sponge" composed of about 24 pounds of water, 32 pounds of blended flour, 6 ounces of yeast, and 6 ounces of malt, thoroughly kneading the same, and then let it stand for about 3½ hours. This "sponge" is now mixed with the above prepared dough and the compound is kneaded for about 10 minutes. To the entire compound, I now add about 24 pounds of water, 42 pounds of blended flour, and 2 pounds of salt, to give taste and expansion, thoroughly mixing and kneading the entire compound.

This compound is now allowed to rest for about 1 to 1½ hours, whereupon it is ready to be cut into loaves by machinery and baked in the usual manner.

In practice, I have found that dough made according to this process is more workable and produces a better tasting bread than that heretofore produced, and furthermore, that it is easily digestible and will keep fresher for a longer period than is the case with most breads now on the market.

Of course, it will be understood that the proportions given may slightly vary in either direction without departing from the spirit of the invention.

What I claim as my invention is:

1. The process of preparing bread-dough, which consists in first adding to a suitable quantity of boiling water rye-flour and thoroughly kneading the same; then setting it for about twelve hours to allow fermentation; then adding to and kneading with the same a separately prepared "sponge" composed of a suitable quantity of water, blended flour, yeast and malt; then adding to and kneading with the entire compound a suitable quantity of blended flour and salt mixed in a suitable quantity of water; and finally allowing the dough to rest before cutting into loaves, substantially as set forth.

2. The process of preparing dough for the manufacture of bread, which consists in taking about 4 pounds of water and heating the same to about 200 degrees Fahr. and then adding thereto about 2 pounds of rye-flour and kneading the same; then setting it for about 12 hours to allow fermentation; then adding to and kneading with the same for about 10 minutes a separately prepared "sponge" composed of about 24 pounds of water, 32 pounds of blended flour, 6 ounces of yeast and 6 ounces of malt which had previously been thoroughly kneaded and allowed to stand for about 3¼ hours; thereupon adding to and kneading with the entire compound about 24 pounds of water, 42 pounds of blended flour and 2 pounds of salt, and finally allowing the compound to rest for about 1 to 1½ hours, substantially as and in the manner hereinbefore set forth.

3. A bread-dough containing approximately 2 pounds of rye-flour, 74 pounds of blended flour, 6 ounces of yeast, 6 ounces of malt, 2 pounds of salt and about 52 pounds of water, compounded substantially as set forth.

Signed at New York city, N. Y., this 5th day of June, 1917.

JOHN H. KRETNER.

Witnesses:
  MAURICE BLOCK,
  EDWARD A. JARVIS.